May 3, 1966   E. SCHIBLI ET AL   3,249,835
CAPACITOR WITH CORONA PREVENTION MEANS
Filed May 29, 1964
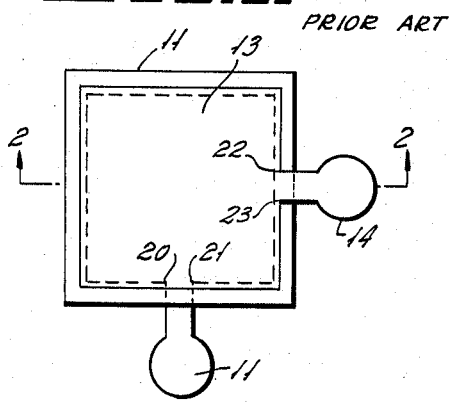
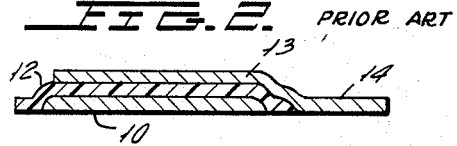
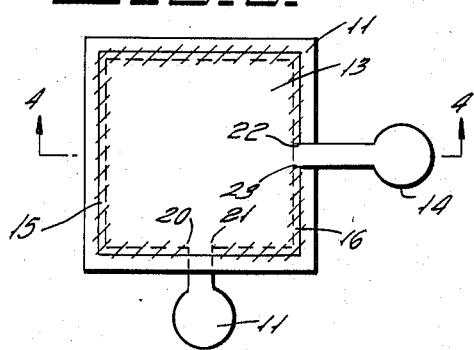
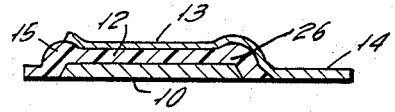
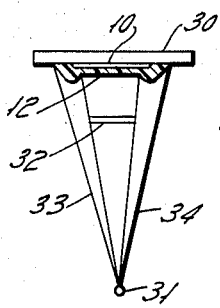
INVENTORS
EUGENE SCHIBLI
GERALD SHAPIRO
BY
OSTROLENK, FABER, GERB & SOFFEN
ATTORNEYS

3,249,835
CAPACITOR WITH CORONA PREVENTION MEANS

Eugene Schibli, Pittsburgh, Pa., and Gerald Shapiro, Everett, Mass., assignors to Technion Research and Development Foundation Ltd., Haifa, Israel
Filed May 29, 1964, Ser. No. 371,200
3 Claims. (Cl. 317—261)

Our invention relates to thin film capacitors, and more specifically relates to the formation of a bead about the rim of a thin film capacitor to improve the dielectric strength thereof.

Thin film capacitors are well known to the art wherein a conductive layer is formed by any suitable deposition technique. This layer is then coated by a dielectric body by another deposition technique, and thereafter a second electrode is deposited on the dielectric coating which, with the first electrode, forms a capacitor.

The thickness of the dielectric in these devices normally varies from about 100 angstroms to several microns. We have discovered that, while spraying on the dielectric, it is desirable to increase the thickness of the dielectric in a region adjacent to the rim of the conductive coating therebeneath. This will then form a bead around the dielectric coating whereby the dielectric strength around the edge of the conductive coatings formed in the capacitor, and particularly at the area where terminal tabs are taken out from the conductive coatings, is increased.

Accordingly, a region of increased dielectric strength is then provided in those areas where the dielectric stress will be the highest, whereby break-downs of the device are avoided due to puncture of the dielectric at these regions, although the main body of the dielectric still retains the same very small thickness.

Accordingly, a primary object of this invention is to provide a novel structure for a thin film capacitor which improves the dielectric strength of the capacitor.

Another object of this invention is to provide a novel arrangement for the dielectric of a thin film capacitor which prevents break-down along the edge regions of the capacitor electrodes.

These and other objects of the invention will become apparent from the following description when taken in connection with the accompanying drawings, in which:

FIGURE 1 is a top view of a thin film capacitor constructed in accordance with prior art techniques.

FIGURE 2 is a cross-sectional view of the capacitor of FIGURE 1 taken across the lines 2—2 in FIGURE 1.

FIGURE 3 is a top view of the capacitor of the present invention which schematically illustrates a region in which the dielectric thickness is increased.

FIGURE 4 is a cross-sectional view of FIGURE 3 taken across the lines 4—4 in FIGURE 3.

FIGURE 5 illustrates the placement of a mask for permitting the formation of the bead or increased dielectric thickness during the dielectric deposition operation.

Referring first to FIGURES 1 and 2, we have illustrated therein a typical thin film capacitor which includes a bottom electrode 10 which has a tab 11 projecting therefrom. A dielectric layer 12 is then coated atop electrode 10 and is, in turn, coated with a top electrode 13 which has a projecting tab-type terminal 14. Note that the dielectric layer 12 extends completely beyond bottom electrode 10 so that electrodes 10 and 13 are fully insulated.

Such capacitors are commonly made through the use of evaporation techniques, vacuum sputtering techniques, or other electrode deposition techniques. Thickness of the dielectric in these thin film capacitors varies from the order of 100 angstroms to several microns, while the thickness of the two metal electrodes 10 and 13 may be of the order of 1000 angstroms. In such devices the electric fields between electrodes 10 and 13, apart from the edges of the electrode, is relatively homogeneous. However, at the electrode edges and because of the very small radius of curvature of the conductors, the electric field is considerably larger, this field being most pronounced at the junction of the terminal tabs and the electrode foil; for example, at locations 20, 21, 22 and 23. Therefore, dielectric break-down in such devices will occur particularly at these points at lower voltages than anywhere else throughout the area of the device.

As a consequence of this break-down, the dielectric is punctured, and the metal of one or both electrodes 10 and 13 will evaporate continuously until the capacitor is disconnected from its terminals 11 and 14.

The principle of the present invention is to provide a novel bead on the dielectric particularly at regions 20 through 23, and more generally around the complete rim of the layer electrode 10. In this manner, the dielectric strength of the dielectric film is substantially increased at the region of severest dielectric stress without however substantially increasing the weight of overall thickness of the device.

By way of example, and as shown in FIGURE 3, the region illustrated by the cross-hatched line indicates a region of increased thickness for the dielectric film.

This is best shown in FIGURE 4, for example, where the film has increased bead-like sections 25 and 26 which increase the dielectric strength of the dielectric at the points of greatest dielectric stress. By way of example, the thickness of these bead sections can be of the order of 150% of the normal thickness of the dielectric layer.

In the manufacture of such devices, which is well known to the art, and as is schematically illustrated in FIGURE 5, a substrate, which may be a glass slide 30, has the bottom electrode 10 suitably deposited thereon. Thereafter, the dielectric coating 12 is deposited thereon, for example, from some suitably heated source 31 of dielectric material exactly as in the prior art technique. Once the desired thickness is achieved, a mask 32 of any suitable material is interposed between the dielectric source 31 and the work material so that, as illustrated by areas 33 and 34, only an annular area of dielectric material will be deposited upon the work thereby forming the desired bead shape around the periphery of the bottom electrode 10. Thereafter, the top electrode is deposited on the dielectric layer in the usual manner.

While the method described in FIGURE 5 applies particularly to the formation of thin film devices in a commercially available vacuum coating unit, it is to be clearly noted that the novel capacitor of the invention could also be made electrolytically, or in any other desired manner.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A thin film capacitor comprising a bottom electrode of conductive material, a layer of dielectric material coating the upper surface of said bottom electrode and extending beyond the edges of said bottom electrode, and a top electrode of conductive material coating the upper surface of said dielectric layer and insulated from said bottom electrode by said dielectric material; said top and bottom electrodes having respective integral tab sections extending therefrom beyond said dielectric layer; said dielectric layer having increased thickness regions compared to the thickness of the body of said dielectric layer; said increased thickness regions being located adjacent each of the junctions between said tabs and their said respective electrodes.

2. The device of claim 1 wherein said increased thickness regions extend around the periphery of said dielectric layer to form a continuous bead thereon.

3. The device substantially as set forth in claim 2 wherein the bottom of said bottom electrode, the bottom of said portion of said dielectric layer extending beyond said bottom electrode and the bottom of said tab extending from said top electrode are in the same plane.

References Cited by the Examiner

UNITED STATES PATENTS

| | | | |
|---|---|---|---|
| 2,065,921 | 12/1936 | Gerth | 317—261 |
| 2,251,540 | 8/1941 | Buschbeck | 317—242 |
| 2,398,176 | 4/1946 | Deyrup | 317—261 X |
| 2,759,854 | 8/1956 | Kilby. | |

ROBERT K. SCHAEFER, *Primary Examiner.*

JOHN F. BURNS, *Examiner.*

E. GOLDBERG, *Assistant Examiner.*